March 6, 1945. M. A. STICELBER 2,370,888
COMBINATION DOUGH MIXER AND WATER COOLING DEVICE
Filed Nov. 9, 1942
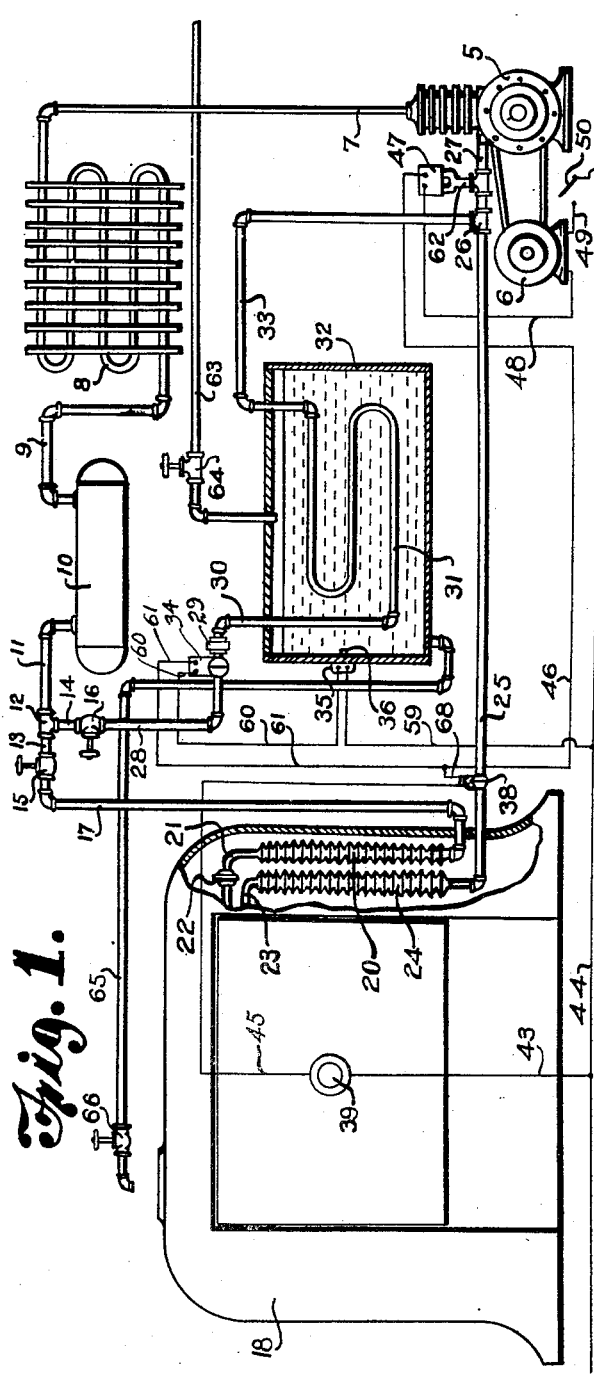
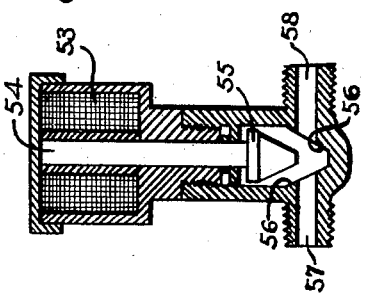
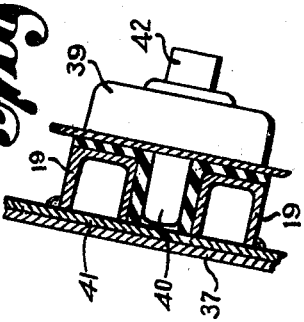
INVENTOR
MERLIN A. STICELBER
BY Alfred R. Fuchs
ATTORNEY Patented Mar. 6, 1945

2,370,888

UNITED STATES PATENT OFFICE 2,370,888

COMBINATION DOUGH MIXER AND WATER-COOLING DEVICE

Merlin A. Sticelber, Kansas City, Mo.

Application November 9, 1942, Serial No. 465,006

13 Claims. (Cl. 62—1)

My invention relates to refrigerating means, and more particularly to a refrigerating means for cooling a dough mixer and for also cooling water.

It has been found that in practice some dough mixers do not have a sufficiently large wall area thereof available for application of a cooling coil thereto, to enable the combination refrigerating means and water cooling device, disclosed in my Patent No. 2,315,230, patented March 30, 1943, to be applied thereto and obtain both efficient cooling of the water and the dough mixer wall. It is a purpose of my invention to provide means for cooling water and a dough mixer wall, in which the water cooling means is not incorporated in the cooling element for the dough mixer wall, but in which both the water cooling means and the dough mixer wall cooling means are parts of the same refrigerating system.

The water cooling means is provided to cool the make-up water used in mixing dough. The make-up water is the water that is one of the ingredients of the dough and it is desirable that it be cold. At the same time it is desirable that the dough be kept cool after the mixing is started so as to prevent undue rise in temperature thereof, which, during the mixing or kneading operation would otherwise ordinarily take place, as such rise in temperature is harmful to the quality of the dough if it reaches a certain point. By providing both cold make-up water to start the dough and cooling the dough mixer during the mixing operation, the temperature can be kept within a desired range to get the best results in the finished dough.

Preferably, the make-up water is as near to the freezing point as practicable when supplied to the mixer. My improved refrigerating means includes means for cooling water to the desired temperature, and at the same time provides means for cooling the dough mixer wall to the temperature desired for preventing undue rise in temperature of the dough in the mixing operation.

While it has been previously known, as disclosed in my Patent No. 2,274,220, patented February 24, 1942, to cool the walls of a dough mixer by means of direct expansion refrigerating means, and while direct expansion refrigerating means have also been used for cooling water, the two expansion coils, that is, the one for cooling the water and the one for cooling the dough mixer, have been entirely independently operated as parts of two entirely independent refrigerating systems. This has involved the duplication of much equipment and involved an unnecessary expense, both of which can be avoided by my improved refrigerating system.

In refrigerating systems of the type disclosed in my Patent No. 2,274,220, it is customary to provide a pressure controlled switch for starting the compressor to draw expanded refrigerant from the suction line when the pressure in such suction line or the intake connection to the compressor has reached a predetermined maximum value, and to stop the operation of such compressor when the pressure in said suction line or intake connection has reached a minimum pressure. Such controlling means is common and is necessary in order to maintain the efficient operation of a refrigerating means in which the load is intermittent. However, in operating a plurality of expansion coils in conjunction with such a pressure controlled switch for throwing the compressor into and out of operation, in a system in which the two expansion coils are subjected to different conditions and carry different loads at different times, it is necessary to provide means for controlling the flow of refrigerant through the two expansion coils independently of each other. It was further found that a serious obstacle to providing such a system in which a dough mixer was to be cooled along with a water cooling device, was that the efficiency of the cooling of the dough mixer was interfered with by the operation of the refrigerating means to cool the water.

This was found to be due to the fact that continued operation of the compressor after a batch of dough had been removed from the dough mixer, caused the refrigerant to be withdrawn through the suction line from the direct expansion coil mounted on the dough mixer wall, to such an extent that upon placing of the next batch of dough therein, the cooling of the walls to cool the contents of the dough mixer was not carried forwardly rapidly enough to effectively cool the dough. It is accordingly the principal purpose of my invention to provide, in a refrigerating system of the above mentioned character, means for preventing the withdrawal of the refrigerant from the cooling coil for cooling the dough mixer when the dough mixer is at the desired low temperature below which it is not desired to cool the wall of the mixer.

More particularly it is a purpose of my invention to provide a refrigerating system in which two cooling coils, which are subjected to loads of different character and of different variation are supplied with refrigerant from the same receiver and connected with the same compressor, such as the cooling coil for a dough mixer wall and the cooling coil of a water cooling device, the flow of refrigerant through each cooling coil being controlled by thermostatic means associated with the part or material to be cooled in such a manner as to be responsive to the temperature thereof, said means comprising an electro-magnetically operated valve controlled by said thermostatic means to permit flow of refrigerant through the particular cooling coil with which the valve is associated, the valve associated with the cooling coil having the widest variation in load, such as the dough mixer cooling coil, being provided in the return or suction line leading from the cooling coil to the compressor and being so controlled by the temperature responsive means as to shut off the valve to prevent draining of the refrigerant from said cooling coil, after the desired temperature has been attained to operate the temperature responsive means, in case the compressor should still be in operation to circulate refrigerant through the other cooling coil.

Other objects and advantages of my invention will appear as the description of the drawing proceeds. I desire to have it understood, however, that I do not intend to limit myself to the particular details shown or described, except as defined in the claims.

In the drawing:

Fig. 1 is a diagrammatic view of my improved refrigerating apparatus.

Fig. 2 is a vertical sectional view through an electromagnetic valve for use in my refrigerating system, and Fig. 3 is a fragmentary view through one of the thermostatic elements used in connection with my invention.

Referring in detail to the drawing, my improved refrigerating system is shown as comprising a compressor 5 driven in any suitable manner by means of a motor 6, from which the conduit 7 extends to a condenser 8 and from said condenser a conduit 9 extends to the receiver 10. From the receiver 10 a liquid refrigerant conduit 11 extends to a T 12 from which the branch conduits 13 and 14 extend to the manually operated valves 15 and 16, respectively.

From the valve 15 the conduit 17 extends to the expansion coil provided on the wall of the dough mixer 18, the same being made in a similar manner to that disclosed in my Patent No. 2,274,220, portions thereof being shown at 19 in Fig. 3. As the bowl of the dough mixer has to be tilted from one position to another, the flexible conduit portion 20 is provided between the conduit or pipe 17 and the conduit or pipe 21, which leads into the expansion coil 19 through the expansion device 22. An expanded refrigerant or return conduit, or suction conduit, 23 leads from the expansion coil 19 to the flexible conduit portion 24, which connects with the suction pipe 25 leading to a T 26, from which the suction pipe 27 extends into the intake connection of the compressor 5.

From the valve 16 a conduit 28 extends to the expansion device 29 and through said expansion device to the conduit 30 leading to the expansion coil 31 provided in the water tank 32. A suction pipe or return conduit 33 extends from said refrigerant coil 31 to the T 26.

It will thus be seen that the two expansion coils 19 and 31 are connected in parallel between the receiver 10 and the compressor 5 and that either can be put out of operation without the other being put out of operation, by manually opening and closing the appropriate valves 15 and 16. It is desirable to maintain the dough mixer wall at a certain predetermined temperature and the water in the tank 32 at a different predetermined temperature. It is in fact ordinarily desirable to provide for adjustment of the apparatus to provide a different temperature for the dough mixer wall under different conditions. Thus it is ordinarily desirable to keep the dough mixer wall at a temperature of slightly above freezing, substantially 33° F. being preferable, although at times it may be desirable to reduce the temperature below the freezing point of water. On the other hand, the water in the tank 32 must be kept above its freezing point, and preferably, is kept at a safe margin above the freezing point of water, such as between 35° F. and 40° F. Preferably, the apparatus is adjusted to maintain the water in tank 32 within a certain temperature range having a predetermined minimum and that adjustment is maintained under all ordinary circumstances. To control the temperatures of the dough mixer wall and the water, suitable temperature responsive controlling devices, which may be any commonly known thermostatic switching means, are provided, there being one such means for controlling the flow of refrigerant through the water cooling coil and another such means for controlling the flow of refrigerant through the dough mixer cooling coil.

While the dough mixer operates intermittently, and also of course, water is withdrawn from the water cooling tank intermittently, the changes in load on the dough mixer cooling coil are much more sudden and of wider variation than those on the water cooling coil. This is due to the fact that although water is withdrawn each time that a batch of dough is to be mixed, and water at the temperature of tap water is introduced into the tank 32, the change in temperature of the water is not sudden, because a large body of water is cooled in the tank and only a portion thereof is ordinarily withdrawn in mixing a dough, and only a fraction of the total water in the tank is replaced by warmer water. However, due to the large body of water in the tank and the character of the cooling coil provided therein, which must not be so large as to interfere with the effective operation of the cooling coil on the dough mixer wall, the reduction in temperature of the water in the tank 32 extends over a long period of time, which may be substantially as long as, or even longer, than required to carry out a mixing operation on a batch of dough in the dough mixer.

The cooling of the dough mixer wall goes through a plurality of different stages, and involves pre-cooling the wall of the mixer to a temperature at or near the freezing point of water before the ingredients of a batch of dough are placed therein, the maintaining of the temperature of the wall at slightly above the freezing point or even sometimes below the freezing point of water during the mixing operation, while the wall is being heated by the rise in temperature of the dough that occurs during the mixing operation, followed by the discharge of the dough from the mixer and the re-establishment of the near freezing temperature on the wall of the empty mixer. This condition of merely maintaining the mixer wall at the desired temperature while empty will continue until the next batch of dough is to be mixed. Obviously a very light or substantially no load is on the cooling coil while the mixer is inactive, and a very heavy load is on the cooling coil while the mixer is operating and the changes from heavy load to light load, and vice versa, occur suddenly.

Accordingly a condition frequently exists in which the flow of refrigerant is stopped through the dough mixer cooling coil by the controlling means, while the flow of refrigerant must be maintained through the water cooling means. If the arrangement of controlling devices shown in my above referred to patent were used for the control of flow of refrigerant through the dough mixer cooling coil, the compressor would withdraw so much refrigerant from the relatively large capacity cooling coil on the dough mixer wall that there would be insufficient refrigerant therein to maintain the dough mixer wall sufficiently cool to obtain effective cooling of the dough in the mixer when the ingredients of a batch of dough are suddenly inserted in the mixer and the mixing operation is begun.

An electro-magnetic valve 34 controls supply of refrigerant to the cooling coil 31, which is, of course, made up of many more turns than shown diagrammatically in the drawing. Said valve is controlled by a temperature responsive, or thermostatic controlling device, 35 mounted on the wall of the tank 32, said thermostatic control keeping the valve 34 open when the temperature of the tank wall 32 is above that at which it is desired to maintain the water, and closes said valve 34 upon the desired minimum temperature being obtained for said wall 32. Or, if desired, the thermostatic element can be of the type that has an extension 36 that extends into the body of liquid whereby the temperature of the liquid directly controls the thermostatic switch of the temperature responsive device 35. The flow of refrigerant through the cooling coil 19 for the dough mixer wall 37 (see Fig. 3) is controlled by means of an electro-magnetically operated valve 38, which is a duplicate of the valve 34, but which is mounted in the suction line 25 to cut off flow of refrigerant from the coil 19 to the compressor 5 when the temperature responsive controlling element 39 mounted on the dough mixer wall is actuated by the wall having reached the desired predetermined minimum temperature. The temperature responsive element 39 may be made in any desired manner, comprising thermostatic switching means such as provided in such devices as the Penn Electric Switch Co., White-Rodgers Electric Co., Minneapolis-Honeywell, Ranco and other standard temperature controls. The control is so made that it comprises a bulb-like portion 40 containing a fluid expanding with rise in temperature thereof, which is in contact with the sheet 41, which is in heat conducting relation with the dough mixer wall 37 and this bulk-like portion is connected by any suitable means such as a conduit with a bellows or similar element constituting part of an adjustable thermostatic switching element, which may be adjusted by any suitable means, such as the knob 42, so that at a desired temperature setting the circuit through the thermostatic element will be closed and will remain closed until the temperature of the wall 37 drops below the setting of said element. The temperature responsive element 35 is made in a similar manner and the extension 36 corresponds to the body portion 40, in function.

A conductor 43 extends from the line wire 44 to the thermostatic element 39 and a conductor 45 extends from said thermostatic element 39 to the electro-magnetic valve member 38, so that the thermostatic switching means is interposed between the conductors 43 and 45 to open or close the circuit between said conductors, dependent upon whether the temperature desired has or has not been reached. From the electromagnetic valve member 38 a conductor 68 extends to a conductor 46, which is connected with one terminal of a pressure responsive switch 47, from the other terminal of which the conductor 48 leads to the motor 6. A conductor 49 leads to a manually operated switch 50, which connects the other terminal of the motor 6 with the line wire 51 through a conductor 52.

The general type of electro-magnetic valve is shown in Fig. 2, in which the solenoid 53 is provided to pull the plunger 54 upwardly within the same, when energized, said plunger carrying a valve member 55, which is adapted to engage a seat 56 when released by the solenoid 53, said valve dropping by gravity into seating position to close the passage 57 off from the passage 58. The valve is shown merely to more clearly illustrate the invention, the particular type of valve and the structural details thereof being of no importance to the invention, as long as energization of the winding 53 will open the valve and de-energization thereof will close it.

It will accordingly be seen that when the thermostatic element 39 opens the circuit in which the winding 53 is located, due to the fact that the desired low temperature has been reached by the dough mixer wall, the valve 38 will close so that the passage from the cooling coil 19 to the compressor 5 will be closed. The flow of refrigerant through the expansion device 22, after such closing of the valve 38, will soon cease. Upon the temperature of the dough mixer wall rising above the predetermined desired temperature thereof, the thermostatic switching means in the temperature responsive element 39 will close and the solenoid 53 will be energized to open the valve 38, raising the valve member 55 off its seat.

The valve member 34 is similarly controlled through the thermostatic element 35, which has the conductor 59 extending from the line wire 44 to the thermostatic switching element in said temperature responsive controlling means 35, and has the conductor 60 extending therefrom to the electro-magnetic valve member 34, and a conductor 61 extends from said electro-magnetic valve 34 to the conductor 46. The thermostatic element 35 is so adjusted that the circuit between the conductors 59 and 60 will be broken when the water in the tank 32 reaches the desired low temperature, de-energizing the winding 53 in the electromagnetic valve 34 to close said valve and thus prevent flow of refrigerant through the coil 31 due to the fact that the same is cut off from the receiver 10 by closing said valve.

The pressure responsive switching means 47 is of any well known type and is connected through suitable conduit means, such as the conduit 62, with the intake side of the pump, or with the return pipe or conduit 27 leading into the pump. The mounting of the switch is only shown diagrammatically in Fig. 1, as is also the switch itself, as the construction thereof is of no particular importance to the invention, many different switches of the type used being commonly found on the market. The switch is generally of the character that the same is moved in one direction when a certain minimum pressure is reached, and in an opposite direction when a certain maximum pressure is reached in the connection leading to the same, such as the conduit 62. The switch is ordinarily utilized so as to open the circuit when a minimum pressure of, let us say, 5 lbs. per sq. in. is reached in the suction pipe, and which will close when a maximum pressure of, let us say, 20 lbs. per sq. in. is reached in the suction pipe.

The motor 6 accordingly will operate whenever the switch 47 closes, when either of the thermostatic switches in the temperature responsive devices 35 and 39 is closed. If the valve 38 were not provided in the suction line, but were located in the liquid refrigerant line leading to the dough mixer cooling coil, then the flow of refrigerant into the dough mixer cooling coil would be cut off and the compressor 5 might be operating either continuously or intermittently, dependent on whether the device 35 remains closed or is opened and closed periodically while switch 47 remains closed and if the compressor were operating at any time that the cooling coil for the dough mixer wall is not being supplied with refrigerant and the valve 38 were not provided in the suction line, the refrigerant would be withdrawn by the action of the compressor from the dough mixer cooling coil, and the longer that the dough mixer would be idle, the greater would be this loss of refrigerant from the coil due to the action of the compressor. However, with the valve 38 always closed when no flow of refrigerant through the dough mixer cooling coil is required, the refrigerant will be held in the cooling coil of the dough mixer, no matter what periodically or continuous operation of the compressor 5 may occur due to the opening and closing of either the switch 47 or the switch associated with the temperature responsive member 35.

A water supply pipe 63 is shown leading to the tank 32 and is provided with a manually operated valve 64. Any suitable means for supplying the water to the tank may be provided, such as an ordinary float valve, if this is found desirable. A make-up water supply pipe 65 is shown leading from the tank 32 to the dough mixer, a valve 66 being provided for controlling the supply of the water to the dough mixer. Preferably, the flow of water from the tank 32 to the dough mixer is by gravity, although in order to make the diagrammatic showing in the drawing more compact, the tank has been shown at a lower level. However, the manner in which the water is transported from the tank 32 to the dough mixer is of no particular importance to this invention.

When the dough mixer and the water cooling means are to be put out of operation, as over night, for example, the manually operated valves 15 and 16 are closed. The compressor 5 will operate to withdraw refrigerant from the dough mixer cooling coil 19 and also from the cooling coil 31 as the temperature of the mixer wall and of the water rises to operate the thermostatic controlling devices 35 and 39 to open the valves 34 and 38, the compressor 5 operating then in response to the pressure actuated switch 47 to withdraw refrigerant from the two expansion coils whenever the pressure to which the switch is subjected reaches such a value as to close the circuit to the compressor motor 6, this action being commonly known as cycling of the compressor.

What I claim is:

1. In refrigerating apparatus, a mixer, a cooling element therefor, a water cooling device, a cooling element for said water cooling device, a compressor with which both said cooling elements are connected, a condenser interposed between and connected to the discharge side of said compressor and said cooling elements, means controlling the operation of said compressor, comprising means responsive to the temperature of said mixer and means responsive to the temperature of said water cooling device, said temperature responsive means cooperating to only halt operation of said compressor upon both said mixer and said water cooling device having been cooled each to a temperature predetermined for it, and means for interrupting flow of refrigerant to said compressor from said mixer cooling element controlled by the means responsive to the temperature of said mixer.

2. In refrigerating apparatus, a machine operating on batches of material having a tendency to rise in temperature while being operated on, a cooling element therefor, a water cooling device, a cooling element for said water cooling device, a compressor with which both said cooling elements are connected, a condenser interposed between and connected to the discharge side of said compressor and said cooling elements, means controlling the operation of said compressor, comprising thermostatic controlling means responsive to temperature changes of said machine and thermostatic controlling means responsive to temperature changes of said water cooling device, neither of said thermostatic means being capable of halting operation of said compressor without the cooperation of the other thereof, and means preventing pumping of refrigerant from the cooling element of said machine when the thermostatic means of said machine is in condition for halting said compressor.

3. In refrigerating apparatus, a pair of cooling elements one of which is subjected to alternately occurring widely varying loads and the other of which is subjected to relatively slight changes in load, a compressor connected with both said cooling elements, a receiver connected with both said cooling elements, a condenser interposed between and connected to the discharge side of said compressor and said receiver, thermostatic means controlling the operation of said compressor to halt operation thereof only when both cooling elements have satisfied their cooling requirements, and means preventing the draining of refrigerant from said cooling element subjected to the widely varying loads after the same has satisfied its requirements, said last mentioned cooling element being in communication with said receiver continuously under normal operating conditions.

4. The combination with a dough mixer and means for supplying make-up water thereto, of a cooler for said water comprising a refrigerating coil, a refrigerating coil in heat transfer relation to a wall of said dough mixer, said coils being incorporated in a single refrigerating system comprising a compressor and a receiver connected with both of said coils, a condenser interposed between and connected to said compressor and said receiver, means responsive to the temperature of said wall, means responsive to the temperature of said water, said temperature responsive means cooperating to control the operation of said compressor to halt the same when both thereof respond to the predetermined temperatures to which said wall and water respectively are to be cooled, and means for preventing removal of refrigerant from said dough mixer refrigerating coil by operation of said compressor after said wall has reached said temperature.

5. An apparatus of the character described, comprising a compressor, a receiver, a condenser interposed between and connected to said compressor and said receiver, a motor driving said compressor, a pair of cooling coils connected with said compressor and receiver, devices adapted to contain material to be cooled, each of said coils being mounted to transfer heat from the material in one of said devices, and means controlling the operation of said motor comprising a thermostatic switch mounted on each of said devices to respond to temperature changes in the material in said devices to be cooled, an electro-magnetic valve controlling flow of refrigerant through each of said coils, the valve for each coil being controlled by the switch on the device having said coil, said switches being connected in a motor operating circuit so that opening of either thereof without opening of the other thereof will not interfere with the operation of said motor, and a switch responsive to pressure in the suction line and connected in said operating circuit and cooperating with said thermostatic switches to control the operation of said motor.

6. An apparatus of the character described, comprising a compressor, a receiver, a condenser interposed between and connected to said compressor and said receiver, a motor driving said compressor, a pair of cooling coils connected with said compressor and receiver, devices adapted to contain material to be cooled, each of said coils being mounted to transfer heat from the material in one of said devices, and means controlling the operation of said motor comprising a thermostatic switch mounted on each of said devices to respond to temperature changes in the material in said devices to be cooled, an electromagnetic valve controlling flow of refrigerant through each of said coils, the valve for each coil being controlled by the switch on the device having said coil, said switches being connected in a motor operating circuit so that opening of either thereof without opening of the other thereof will not interfere with the operation of said motor, and a switch responsive to pressure at the suction side of said compressor connected in said operating circuit to control operation of said motor responsive to the position of said pressure responsive switch when either of said thermostatic switches is closed or both are closed, one of said valves being mounted in the suction line leading to said compressor from the coil it controls.

7. An apparatus of the character described, comprising a compressor, a receiver, a condenser interposed between and connected to said compressor and said receiver, a motor driving said compressor, a pair of cooling coils connected with said compressor and receiver, devices adapted to contain material to be cooled, each of said coils being mounted to transfer heat from the material in one of said devices, and means controlling the operation of said motor comprising a thermostatic switch mounted on each of said devices to respond to temperature changes in the material in said devices to be cooled, an electromagnetic valve controlling flow of refrigerant through each of said coils, the valve for each coil being controlled by the switch on the device having said coil, said switches being connected in a motor operating circuit so that opening of either thereof without opening of the other thereof will not interfere with the operation of said motor, and a switch responsive to pressure at the suction side of said compressor connected in said operating circuit to control operation of said motor responsive to the position of said pressure responsive switch when either of said thermostatic switches is closed or both are closed, one of said valves being mounted in the suction line leading to said compressor from the coil it controls and the other of said valves being mounted in the liquid line between said receiver and the other coil.

8. In refrigerating apparatus, a mixer, a cooling element therefor, a water cooling device, a cooling element for said water cooling device, a compressor with which both said cooling elements are connected, a condenser interposed between and connected to the discharge side of said compressor and said cooling elements, means controlling the operation of said compressor, comprising means responsive to the temperature of said mixer and means responsive to the temperature of said water cooling device, said temperature responsive means cooperating to only halt operation of said compressor upon both said mixer and said water cooling device having been cooled each to a temperature predetermined for it, and an electro-magnetic valve mounted in the suction line leading to said compressor from said mixer cooling element and operated by the means responsive to the temperature of the mixer to close said valve upon said mixer reaching a predetermined temperature.

9. In refrigerating apparatus, a machine for operating on batches of material having a tendency to rise in temperature while being operated on, a cooling element therefor, a water cooling device, a cooling element for said water cooling device, a compressor with which both said cooling elements are connected, a condenser interposed between and connected to the discharge side of said compressor and said cooling elements, means controlling the operation of said compressor, comprising thermostatic controlling means responsive to temperature changes of said machine and thermostatic controlling means responsive to temperature changes of said water cooling device, neither of said thermostatic means being capable of halting operation of said compressor without the cooperation of the other thereof, and an electro-magnetic valve mounted in the suction line leading to said compressor from said machine cooling element, the thermostatic means responsive to temperature changes of said machine comprising a switch controlling operation of said electro-magnetic valve to close the same when said thermostatic means is in condition for halting said compressor.

10. In refrigerating apparatus, a pair of cooling elements one of which is subjected to alternately occurring widely varying loads and the other of which is subjected to relatively slight changes in load, a compressor connected with both said cooling elements, a thermostatic controlling device for each cooling element, said thermostatic devices controlling the operation of said compressor to halt operation thereof only when both cooling elements have satisfied their cooling requirements, and an electro-magnetic valve controlled by the thermostatic device for said cooling element subjected to the widely varying loads to prevent the draining of refrigerant from said cooling element subjected to the widely varying loads after the same has satisfied its requirements.

11. The combination with a dough mixer and means for supplying make-up water thereto, of a cooler for said water comprising a refrigerating coil, a refrigerating coil in heat transfer relation to a wall of said dough mixer, said coils being incorporated in a single refrigerating system comprising a compressor and a receiver connected with both of said coils, a condenser interposed between and connected to said compressor and receiver, means responsive to the temperature of said wall, means responsive to the temperature of said water, said temperature responsive means cooperating to control the operation of said compressor to halt the same when both thereof respond to the predetermined temperature to which said wall and water are to be cooled respectively, manually operated means controlling flow of refrigerant to each of said coils, means for preventing removal of refrigerant from said dough mixer refrigerating coil by operation of said compressor after said wall has reached its predetermined temperature, and means responsive to pressure in the suction line to said compressor adapted to cause said compressor to cycle when said manually operated means have been adjusted to prevent flow of refrigerant to said coils, and at least one of said temperature responsive means has not responded to its predetermined temperature.

12. The combination with a dough mixer and means for supplying make-up water thereto, of a cooler for said water comprising a refrigerating coil, a refrigerating coil in heat transfer relation to a wall of said dough mixer, said coils being incorporated in a single refrigerating system comprising a compressor and a receiver connected with both of said coils, a condenser interposed between and connected to said compressor and receiver, means responsive to the temperature of said wall, means responsive to the temperature of said water, said temperature responsive means cooperating to control the operation of said compressor to halt the same when both thereof respond to the predetermined temperatures to which said wall and water respectively are to be cooled, and an electro-magnetic valve controlled by the means responsive to the temperature of said wall to prevent draining of said dough mixer refrigerating coil by operation of said compressor after said wall has reached said temperature.

13. An apparatus of the character described, comprising a compressor, a receiver, a condenser interposed between and connected to said compressor and said receiver, a motor driving said compressor, a pair of cooling coils each connected at one end thereof with said compressor and at the other end thereof with said receiver, a pair of devices adapted to contain material to be cooled, each of said coils being mounted to transfer heat from the material in one of said devices, and means controlling the operation of said motor comprising a thermostatic switch mounted on each of said devices to respond to temperature changes in the material in said devices to be cooled, an electro-magnetic valve controlling flow of refrigerant through each of said coils, a motor operating circuit comprising branches connected in parallel with each other and each branch including one of said switches and a valve opening magnet winding in series there with, said valves having a normal tendency to move to closing position, the valve for each coil being controlled by the switch on the device having said coil, a common conductor in said circuit leading from both said branches to said motor, and a switch responsive to pressure changes in the suction line of said compressor interposed in said common conductor, and cooperating with said thermostatic switches to control operation of said motor when either of said thermostatic switches is closed or both are closed.

MERLIN A. STICELBER.